United States Patent
Geddes

(10) Patent No.: US 11,561,180 B2
(45) Date of Patent: Jan. 24, 2023

(54) HYDROPHILIC COATINGS OF PLASMONIC METALS TO ENABLE LOW VOLUME METAL-ENHANCED FLUORESCENCE

(71) Applicant: UNIVERSITY OF MARYLAND, BALTIMORE COUNTY, Baltimore, MD (US)

(72) Inventor: Chris D. Geddes, BelAir, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 723 days.

(21) Appl. No.: 15/746,101

(22) PCT Filed: Jul. 22, 2016

(86) PCT No.: PCT/US2016/043471
§ 371 (c)(1),
(2) Date: Jan. 19, 2018

(87) PCT Pub. No.: WO2017/015531
PCT Pub. Date: Jan. 26, 2017

(65) Prior Publication Data
US 2018/0209906 A1    Jul. 26, 2018

Related U.S. Application Data

(60) Provisional application No. 62/195,532, filed on Jul. 22, 2015.

(51) Int. Cl.
*G01N 33/53* (2006.01)
*G01N 21/64* (2006.01)
*G01N 21/76* (2006.01)

(52) U.S. Cl.
CPC ....... *G01N 21/648* (2013.01); *G01N 21/6408* (2013.01); *G01N 21/6428* (2013.01); *G01N 21/6452* (2013.01); *G01N 21/6458* (2013.01); *G01N 21/6445* (2013.01); *G01N 21/6489* (2013.01); *G01N 21/76* (2013.01); *G01N 2021/6439* (2013.01)

(58) Field of Classification Search
CPC ............. G01N 21/648; G01N 21/6428; G01N 21/6408; G01N 21/6452; G01N 21/6458; G01N 21/6489; G01N 21/6445; G01N 21/76; G01N 2021/6439; G01N 2470/00; G01N 2470/04; G01N 2470/06; G01N 2470/10; G01N 2470/12
See application file for complete search history.

(56) References Cited

U.S. PATENT DOCUMENTS

| | | |
|---|---|---|
| 4,662,969 A | 5/1987 | Wang et al. |
| 4,672,040 A | 6/1987 | Josephson |
| 4,735,778 A | 4/1988 | Maruyama et al. |
| 5,017,009 A | 5/1991 | Schutt et al. |
| 5,049,434 A | 9/1991 | Wasulko |
| 5,449,918 A | 9/1995 | Krull et al. |
| 5,766,953 A | 6/1998 | Kennedy |
| 5,779,976 A | 7/1998 | Leland et al. |
| 5,780,249 A | 7/1998 | Wang et al. |
| 5,866,433 A | 2/1999 | Schalkhammer et al. |
| 6,066,448 A | 5/2000 | Wohlstadter et al. |
| 6,140,045 A | 10/2000 | Wohlstadter et al. |
| 6,329,209 B1 | 12/2001 | Wagner et al. |
| 6,362,011 B1 | 3/2002 | Massey et al. |
| 7,095,502 B2 | 8/2006 | Lakowicz et al. |
| 7,400,397 B2 | 7/2008 | Lakowicz et al. |
| 7,718,804 B2 | 5/2010 | Geddes et al. |
| 7,732,215 B2 | 6/2010 | Geddes et al. |
| 7,939,333 B2 | 5/2011 | Geddes et al. |
| 8,008,067 B2 | 8/2011 | Geddes et al. |
| 8,034,633 B2 | 10/2011 | Geddes |
| 8,075,956 B2 | 12/2011 | Geddes et al. |
| 8,101,424 B2 | 1/2012 | Geddes |
| 8,114,598 B2 | 2/2012 | Geddes et al. |
| 8,182,878 B2 | 5/2012 | Geddes et al. |
| 8,318,087 B2 | 11/2012 | Geddes |
| 8,338,602 B2 | 12/2012 | Geddes et al. |
| 8,404,450 B2 | 3/2013 | Geddes et al. |
| 8,569,502 B2 | 10/2013 | Geddes et al. |
| 8,618,505 B2 | 12/2013 | Geddes |
| 8,679,402 B2 | 3/2014 | Geddes |
| 8,679,855 B2 | 3/2014 | Geddes |
| 8,722,428 B2 | 5/2014 | Geddes |
| 8,735,175 B2 | 5/2014 | Geddes |

(Continued)

FOREIGN PATENT DOCUMENTS

WO    WO2014146115    *  9/2014    ............. A01D 84/00

OTHER PUBLICATIONS

Zhu et al. (Scientia Iranica 2011; 18(6), 1627-1630).*
Aslan, K. et al. (2005) Microwave-accelerated metal-enhanced fluorescence: Platform technology for ultrafast and ultrabright assays. Analytical Chemistry, vol. 77, pp. 8057-8067.
Aslan, K. et al. (2005) Metal-enhanced fluorescence: an emerging tool in biotechnology, *Current Opinion in Biotechnology* 16, 55-62.
Aslan, K. et al. (2008) Extraction and detection of DNA from *Bacillus anthracis* spores and the vegetative cells within 1 min. *Anal. Chem* 80: 4125-4132.
D'Agostino, S. et al. (2009) Enhanced fluorescence by metal nanospheres on metal substrates, *Opt. Lett.* 34, 2381-2383.
Dragan, A. I. et al. (2010) Metal-enhanced PicoGreen fluorescence: Application for double-stranded DNA quantification, *Anal. Biochem.* 396, 8-12.

(Continued)

*Primary Examiner* — Carmencita M Belei
(74) *Attorney, Agent, or Firm* — Tristan A. Fuierer; Casimir Jones, S.C.

(57) ABSTRACT

The present invention provides for metallic structures comprising a sulfhydryl or amino-terminated hydrophilic coating to provide a layer of hydrophilic character on the surface of the metallic structures thereby allowing the use of low volumes of aqueous solvents of fluorophores that have the ability to "spread out" across the surfaces of the metallic structures and to provide for a more uniform surface coating of fluorophores attached to or near the metallic structures.

9 Claims, 6 Drawing Sheets

(56) References Cited

U.S. PATENT DOCUMENTS

| | | |
|---|---|---|
| 8,759,110 B2 | 6/2014 | Geddes |
| 8,822,228 B2 | 9/2014 | Geddes |
| 8,886,464 B2 | 11/2014 | Geddes |
| 8,906,701 B2 | 12/2014 | Geddes |
| 8,980,179 B2 | 3/2015 | Geddes |
| 8,987,004 B2 | 3/2015 | Geddes |
| 9,023,372 B2 | 5/2015 | Geddes |
| 9,075,018 B2 | 7/2015 | Geddes et al. |
| 9,170,197 B2 | 10/2015 | Geddes et al. |
| 9,217,746 B2 | 12/2015 | Geddes |
| 9,244,012 B2 | 1/2016 | Geddes et al. |
| 9,310,303 B2 | 4/2016 | Geddes |
| 9,339,485 B2 | 5/2016 | Geddes |
| 9,453,797 B2 | 9/2016 | Geddes |
| 9,459,212 B2 | 10/2016 | Geddes |
| 9,500,590 B2 | 11/2016 | Geddes |
| 9,556,474 B2 | 1/2017 | Geddes |
| 9,708,494 B2 | 7/2017 | Geddes et al. |
| 9,719,923 B2 | 8/2017 | Geddes |
| 9,784,682 B2 | 10/2017 | Geddes |
| 9,810,637 B2 | 11/2017 | Geddes |
| 9,816,990 B2 | 11/2017 | Geddes |
| 9,829,436 B2 | 11/2017 | Geddes |
| 2010/0183504 A1 | 7/2010 | Chen |
| 2012/0021443 A1 | 1/2012 | Geddes |
| 2012/0028270 A1 | 2/2012 | Geddes |
| 2012/0168681 A1* | 7/2012 | Lee .................. G01N 23/00 252/408.1 |
| 2014/0175305 A1 | 6/2014 | Zhang |
| 2016/0025634 A1* | 1/2016 | Chou .................. B29C 59/026 435/5 |
| 2016/0202183 A1 | 7/2016 | Geddes |
| 2016/0312174 A1 | 10/2016 | Geddes |

OTHER PUBLICATIONS

Drexhage, K. H. (1970) Influence of a dielectric interface on fluorescence decay time., *J. Lumin I*, 693-701.

Geddes, C. D. et al. (2002) Metal-enhanced fluorescence, *Journal of Fluorescence* 12, 121-129.

Mackowski, S. et al. (2008) Metal-enhanced fluorescence of chlorophylls in single light-harvesting complexes, *Nano. Lett.* 8, 558-564.

Matveeva, E. G. et al. (2007) Metal particle-enhanced fluorescent immunoassays on metal mirrors, *Analytical Biochemistry* 363, 239-245.

Persson, B. N. J. (1978) Theory of dumping of excited molecules located above a metalic-surface., *J. Phys. C Solid State Phys* 4251-4269.

* cited by examiner

| D | INTENSITY at 514nm with 10µM Fluorescein | | | | |
|---|---|---|---|---|---|
| | plastic | 1:10 | 1:50 | 1:100 | 1:1000 |
| 8µL | 5.0 | 378.5 | 430.4 | 439.7 | 503.7 |
| 12µL | 7.4 | 501.0 | 405.4 | 537.5 | 696.7 |
| 16µL | 7.8 | 469.1 | 647.0 | 651.1 | 766.5 |
| 20µL | 13.4 | 801.9 | 769.3 | 847.7 | 854.9 |
| 50µL | 9.8 | 291.5 | 320.8 | 348.1 | 341.5 |
| 80µL | 19.0 | 362.8 | 390.6 | 391.7 | 407.4 |

| E | MEF with 10µM Fluorescein | | | |
|---|---|---|---|---|
| | 1:10 | 1:50 | 1:100 | 1:1000 |
| 8µL | 76 | 87 | 89 | 102 |
| 12µL | 68 | 55 | 73 | 94 |
| 16µL | 60 | 83 | 84 | 99 |
| 20µL | 60 | 57 | 63 | 64 |
| 50µL | 30 | 33 | 36 | 35 |
| 80µL | 19 | 21 | 21 | 21 |

HYDROPHILIC COATINGS OF PLASMONIC METALS TO ENABLE LOW VOLUME METAL-ENHANCED FLUORESCENCE

CROSS-REFERENCE TO RELATED APPLICATIONS

This application is filed under the provisions of 35 U.S.C. § 371 and claims the priority of International Patent Application No. PCT/US2016/043471 filed on Jul. 22, 2016 which in turn claims priority to U.S. Provisional Patent Application No. 62/195,532 filed on Jul. 22, 2015, the contents of which is hereby incorporated by reference herein for all purposes.

BACKGROUND OF THE INVENTION

Field of the Invention

The present invention relates to coated metallic structures, and more particularly, metallic structures coated with a hydrophilic layer for use in metal enhanced emission systems to enhance emissions from fluorophores, luminophores, bioluminescent species, chemiluminescent species and light emitting devices.

Background of the Related Art

In the last decade the interaction of fluorophores with metallic nano-particles has attracted significant literature (1-5), with numerous applications focused at the life sciences (2, 6-9). Fluorophore near-field interactions with plasmon supporting materials typically leads to enhanced fluorescence signatures (3, 5, 10, 11), and reduced fluorophore lifetimes, which, invariably lends itself to enhanced fluorophore photostabilities. Metal-Enhanced Fluorescence (MEF) occurs from fluorophores which are in close proximity to noble metals (in the near-field), most notably close to silver in its $Ag^o$ state, i.e. metallic state with high free surface electron density. However, silver in its $Ag^o$ state is hydrophobic, and thus, small volumes of aqueous media when applied to silver substrates, exhibit classic hydrophilic-hydrophobic interactions. Such repulsion effects of the aqueous hydrophilic liquids on the hydrophobic $Ag^o$ silver surface, often produces non-reproducible fluorescence intensities based on the position of the liquid ball within the well or surface as read by a fluorescence reader (such as a plate reader), preventing/hindering low solution volumes being used on surfaces or within silvered 96-well plates, for applications such as in immunoassays and other diagnostics.

Thus, it would advantageous to provide coated metallic particles with a hydrophilic coating that overcomes the repulsion effects of the aqueous hydrophilic/hydrophobic interactions to provide increased intensity of fluorescence and reduced solution volumes for applications such as in immunoassays and other diagnostics.

SUMMARY OF THE INVENTION

The present invention provides for metallic structures comprising a sulfhydryl or amino-terminated hydrophilic coating to provide a layer of hydrophilic character on the surface of the plasmonic metallic structures thereby allowing the use of low volumes of aqueous solvents of fluorophores that have the ability to "spread out" across the surfaces of the metallic structures and to provide for a more uniform surface coating of fluorophores attached to or near the metallic structures.

The coatings can be provided by any hydrophilic ligand which contains one metal binding group, such as —SH or —NH2 on one end and at least one hydrophilic group on the other terminus. Preferably, the hydrophilic coating has a thickness of about 0.1 nm to 5 nm. The hydrophilicity of the metallic structures can be provided by the attachment of hydrophilic functional groups to the ligands such as PEG, carboxylic acids, sulfonic acids, ammonium salts or zwitterions. Acceptable examples include mercaptoacetic acid (MAA), mercaptopropionic acid (MPA), mercaptoundecanoic acid (MUA), mercaptosuccinic acid (MSA), dihydrolipid acid (DHLA), bis-sulphonated triphenylphosphine, PEG(n)-SH, PEG(n)-NH$_2$, mPEG(n)-SH and mPEG(n)-NH$_2$ wherein n is 5 to 30. Other hydrophilic molecules can be attached to the metallic structures by means of thiol or disulfide groups. For example a polyethylene glycol (PEG) polymer terminated by linear methylene sequence terminated a thiol group can be added to a hydrophilic coating on the metallic structures, pyridinethiol can be added to coat the metallic structures with pyridine ligands, and a great variety of biomolecules such as proteins, nucleic acids, carbohydrates, lipids, etc. can be similarly attached to the metallic structures. Higher order biomaterials such an organelles, a membranes, cells or a complexes of cells can also be bound to the metallic structures.

The hydrophilically coated metallic structures can be used for fluorescence, phosphorescence and chemiluminescence signatures and a range of organic and inorganic chromophores, including quantum dots, semi-conductor emitters and silica nanoparticles. The metallic structures may be fabricated from a plasmonic metal selected from the group consisting of Silver, Gold, Aluminium, Zinc, Rhodium, Copper, Nickel, Palladium, Indium, Tin, Iron, Tungsten, Platinum, Germanium and combinations thereof.

In one aspect the present invention provides a substrate comprising non-connecting metallic structures that are spatially separated, wherein the metallic structures comprise a hydrophilic coating covering all exposed surfaces of the metallic structures. The metallic structures may can be fabricated to form a geometric shape such as spheres, islands, colloid shaped, oblongs, triangle, square, elliptical and/or rectangle. Notably, if the metallic structures comprise an apex area, then preferably the apex areas are arranged so that one apex area is opposite from another apex area and aligned to form a reactive zone to be positioned therebetween. The distances between the apex areas may range from 0.01 nm to 5 mm, more preferably from 2 mm to about 3 mm. The thickness of the metallic structures ranges from 10 nm to about 1000 nm, and more preferably from about 45 nm to about 250 nm.

In one aspect, the present invention provides for a detection system, the system comprising:
  a substrate comprising a multiplicity of metallic structures, wherein the metallic structures comprise plasmonic metals coated with a hydrophilic coating, at least one excitable molecule that is positioned near the metallic structure material in a range from about 5 nm to 50 nm, wherein the excitable molecule is selected from the group of an intrinsic fluorophore, extrinsic fluorophore, fluorescent dye, and luminophores; a source of electromagnetic energy for providing excitation energy to excite the molecule; and
  a detector for detecting emissions from the excited molecule and/or the metallic structure.

The emission enhancement may be observed when the fluorophores or luminophores are positioned from about 5 nm to about 200 nm to metal surfaces. Preferable distances are about 5 nm to about 50 nm from the metallic structures.

Another aspect of the invention relates to a method of enhancing emissions from fluorescence, chemiluminescence, bioluminescence, and luminescence molecules and reactions that exhibit emissions in wavelengths from UV-visible to near IR.

The present invention relates to a method of detection using plasmonic emissions from hydrophilically coated metallic structures caused by fluorescence, chemiluminescence or bioluminescence based reactions. These plasmonic emissions emitted from metallic surface plasmons are generated either with an external excitation or without such external excitation due to chemically induced electronically excited states.

In yet another aspect, the present invention relates to a method of metal-enhanced fluorescence sensing, comprising:
applying metallic structures coated with a hydrophilic coating to a surface used in a detection system;
introducing an aqueous solution containing at least one biomolecule for disposing near the metallic structures, wherein the biomolecule is capable of a chemically induced electronically excited state, and wherein the aqueous solution spreads over the metallic structures exhibiting increase water dispersibility;
triggering the chemically induced electronically excited state of the biomolecule; and
measuring the bioluminescent or chemiluminescent intensity.

In yet another aspect, the present invention relates to a method for detecting a target molecule in a sample, the method comprising:
providing a system comprising:
i) a layer of immobilized metallic structures comprising a plasmonic metal and a hydrophilic coating covering essentially all surfaces of each the metallic structures, wherein the immobilized metallic structures have attached thereto a capture biomolecular probe with an affinity for the target molecule; and
ii) a free biomolecular probe with an affinity for the target molecule, wherein the free biomolecular probe has attached thereto a fluorophore;
contacting the sample with the immobilized metallic structures and capture biomolecular probes, wherein the target molecules binds to the capture biomolecular probes; and
contacting the bound target molecule with the free biomolecular probe, wherein binding of the free biomolecular probe to the target molecule causes the fluorophore to be positioned a sufficient distance from the immobilized metallic structures to enhance fluorescence emission when excited by an irradiating source.

The substrate positioned beneath the hydrophilically coated metallic structures may include glass, quartz, plastics (such as on the bottom of HTS plates, polystyrene, polycarbonate), semiconductors, paper, cellulose, cotton, nylon, silk, sapphire, diamond, ruby, dielectric materials, such as polystyrene etc.

A still further aspect of the invention relates to a bioassay for measuring concentration of receptor-ligand binding in an aqueous test sample, the method comprising:
preparing metallic structures with a hydrophilic coating of the present invention immobilized on a surface wherein the metallic structures have positioned thereon a receptor molecule having affinity for a ligand of interest;
contacting the receptor molecule with the test sample suspected of comprising the ligand of interest, wherein the ligand of interest will bind to the receptor molecule to form a receptor-ligand complex;
contacting the receptor-ligand complex with a detector molecule having affinity for the ligand to form a receptor-ligand-detector complex, wherein the detector molecule comprises a first component of a bioluminescence or chemiluminescence generating system;
exposing the first component of the bioluminescence or chemiluminescence generating system to a trigger solution comprising a second component that will chemically react with the first component to induce a chemically electronically excited state; and
measuring the intensity of radiation emitted from exited metallic surface plasmons and/or test sample.

Preferably, the components of the bioluminescence generating system are a luciferase and a luciferin. The bioluminescence generating system may be selected from the group consisting of those isolated from the ctenophores, coelenterases, mollusca, fish, ostracods, insects, bacteria, a crustacea, annelids, and earthworms. The luciferase may be selected from the group consisting of *Aequorea, Vargula, Renilla, Obelin, Porichthys, Odontosyllis, Aristostomias, Pachystomias,* firefly, and bacterial systems.

In a still further aspect, the present invention relates to an assay using High Throughput Screening (HTS), the method comprising:
providing a well plate used in HTS systems comprising a multiplicity of wells;
introducing metallic structures coated with a hydrophilic coating, wherein the metallic structures are coupled to a binding receptor having affinity for a target molecule;
introducing an aqueous solution comprising the target molecule for binding to the binding receptor to form a binding receptor/target complex,
introducing a fluorophore for binding to any formed binding receptor/target molecule complex, wherein the metallic structures exhibit increased water dispersibility in the aqueous solution;
applying electromagnetic energy to excite the fluorophore; and
measuring the emissions from the system.

For use in HTS plates, such as coated on 96-well and 384 well plates, the hydrophilically coated metallic structures increases the brightness of close proximity fluorophores and photostability as well as providing the ability to reduce the volume of the fluorophore solution within the wells and the metal-enhanced fluorescence enhancement factor increases for the hydrophilic coated surfaces. The significance of this cannot be over stated, especially given that most workers wish to use smaller volumes of reagents to reduce their reagent costs.

Other aspects and advantages of the invention will be more fully apparent from the ensuing disclosure and appended claims.

DETAILED DESCRIPTION OF THE INVENTION

Figure 1:
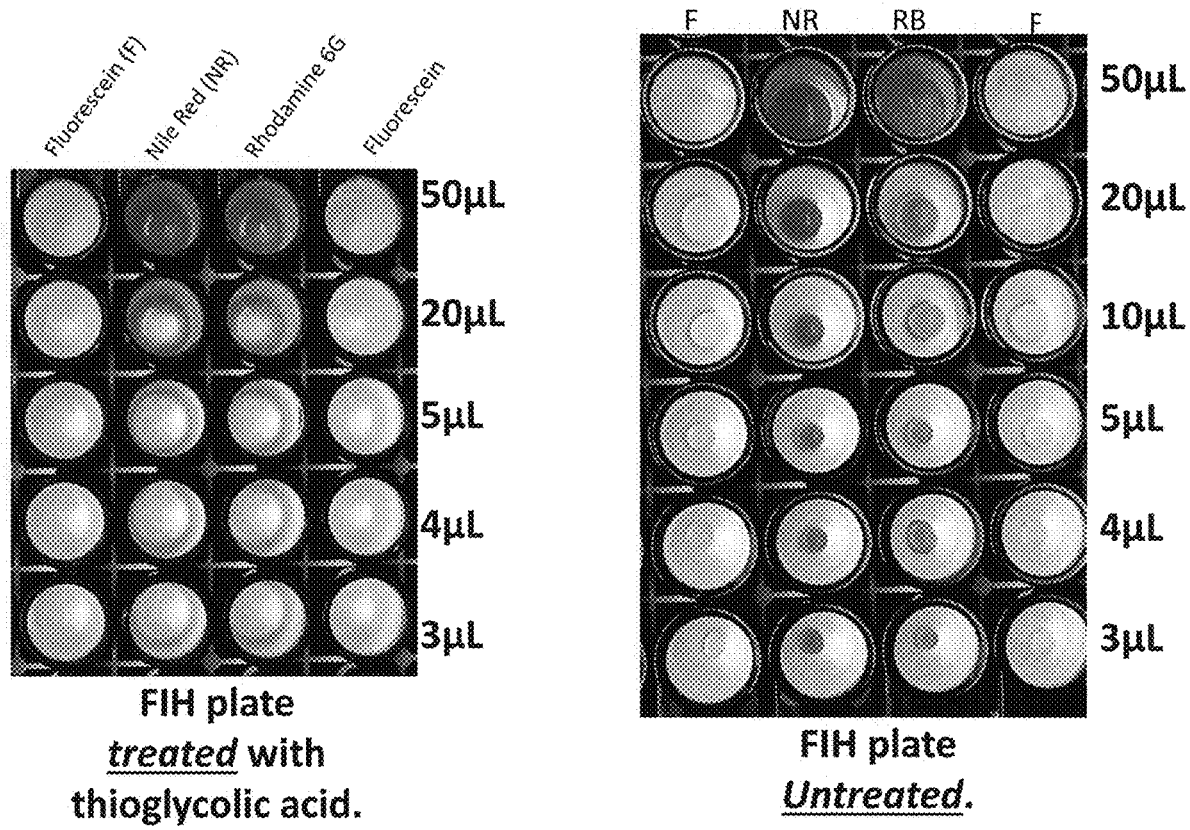
FIG. 1 shows the difference between silver coating treated with thioglycolic acid (mercaptoacetic acid (MAA)) and not treated.

Before the present invention is disclosed and described, it is to be understood that this invention is not limited to the particular process steps and materials disclosed herein as such process steps and materials may vary somewhat. It is also to be understood that the terminology used herein is used for the purpose of describing particular embodiments only and is not intended to be limiting since the scope of the present invention will be limited only by the appended claims and equivalents thereof.

It must be noted that, as used in this specification and the appended claims, the singular forms "a," "an," and "the" include plural references unless the content clearly dictates otherwise.

The term "biomolecule" means any carbon based molecule occurring in nature or a derivative of such a molecule. The biomolecule can be in active or inactive form. "Active form" means the biomolecule is in a form that can perform a biological function. "Inactive form" means the biomolecule must be processed either naturally or synthetically before the biomolecule can perform a biological function. Exemplary biomolecules include nucleic acids, aromatic carbon ring structures, NADH, FAD, amino acids, carbohydrates, steroids, flavins, proteins, DNA, RNA, oligonucleotides, peptide nucleic acids, fatty acids, sugar groups such as glucose etc., vitamins, cofactors, purines, pyrimidines, formycin, lipids, phytochrome, phytofluor, peptides, lipids, antibodies and phycobiliproptein.

Fluorophore," and "fluorescence label," used interchangeably herein, means any substance that emits electromagnetic energy such as light at a certain wavelength (emission wavelength) when the substance is illuminated by radiation of a different wavelength (excitation wavelength) and is intended to encompass a chemical or biochemical molecule or fragments thereof that is capable of interacting or reacting specifically with an analyte of interest in a sample to provide one or more optical signals. Additionally fluorophore includes both extrinsic and intrinsic fluorophores. Extrinsic fluorophore refer to fluorophores bound to another substance. Intrinsic fluorophores refer to substances that are fluorophores themselves. Exemplary fluorophores include but are not limited to those listed in the Molecular Probes Catalogue which is incorporated by reference herein.

Representative fluorophores include but are not limited to Alexa Fluor® 350, Dansyl Chloride (DNS-Cl), 5-(iodoacetamida)fluoroscein (5-IAF); fluoroscein 5-isothiocyanate (FITC), tetramethylrhodamine 5-(and 6-)isothiocyanate (TRITC), 6-acryloyl-2-dimethylaminonaphthalene (acrylodan), 7-nitrobenzo-2-oxa-1,3,-diazol-4-yl chloride (NBD-Cl), ethidium bromide, Lucifer Yellow, 5-carboxyrhodamine 6G hydrochloride, Lissamine rhodamine B sulfonyl chloride, Texas Red™. sulfonyl chloride, BODIPY™, naphthylamine sulfonic acids including but not limited to 1-anilinonaphthalene-8-sulfonic acid (ANS) and 6-(p-toluidinyl) naphthalene-2-sulfonic acid (TNS), Anthroyl fatty acid, DPH, Parinaric acid, TMA-DPH, Fluorenyl fatty acid, Fluorescein-phosphatidylethanolamine, Texas red-phosphatidylethanolamine, Pyrenyl-phophatidylcholine, Fluorenyl-phosphatidylcholine, Merocyanine 540, 1-(3-sulfonatopropyl)-4-[-.beta.-[2 [(di-n-butylamino)-6 naphthyl]vinyl]pyridinium betaine (Naphtyl Styryl), 3,3'dipropylthiadicarbocyanine (diS-$C_3$-(5)), 4-(p-dipentyl aminostyryl)-1-methylpyridinium (di-5-ASP), Cy-3 lodo Acetamide, Cy-5-N-Hydroxysuccinimide, Cy-7-Isothiocyanate, rhodamine 800, IR-125, Thiazole Orange, Azure B, Nile Blue, Al Phthalocyanine, Oxaxine 1, 4', 6-diamidino-2-phenylindole (DAPI), Hoechst 33342, TOTO, Acridine Orange, Ethidium Homodimer, N(ethoxycarbonylmethyl)-6-methoxyquinolinium (MQAE), Fura-2, Calcium Green, Carboxy SNARF-6, BAPTA, coumarin, phytofluors, Coronene, and metal-ligand complexes.

Representative intrinsic fluorophores include but are not limited to organic compounds having aromatic ring structures including but not limited to NADH, FAD, tyrosine, tryptophan, purines, pyrimidines, lipids, fatty acids, nucleic acids, nucleotides, nucleosides, amino acids, proteins, peptides, DNA, RNA, sugars, and vitamins. Additional suitable fluorophores include enzyme-cofactors; lanthanide, green fluorescent protein, yellow fluorescent protein, red fluorescent protein, or mutants and derivates thereof.

Fluorophores with high radiative rates have high quantum yields and short lifetimes. Increasing the quantum yield requires decreasing the non-radiative rates $k_{nr}$, which is often only accomplished when using a low solution temperature or a fluorophore bound in a more rigid environment. The natural lifetime of a fluorophore, $\tau_n$, is the inverse of the radiative decay rate or the lifetime which would be observed if their quantum yields were unity. This value is determined by the oscillator strength (extinction coefficient) of the electronic transition. Hence, for almost all examples currently employed in fluorescence spectroscopy, the radiative decay rate is essentially constant. The modification and control of the radiative rate have also been referred as Radiative Decay Engineering (RDE), or "lightening rod" fluorescence enhancement effect. For example, enhanced intrinsic DNA fluorescence above metallic particles has recently been observed, which is typically not readily observable because of DNA's very low quantum yield of less than $10^{-4}$. The second favorable "lightening rod" effect also increases the fluorescence intensity by locally enhanced excitation. In this case, emission of fluorophores can be substantially enhanced irrespective of their quantum yields.

The reduction in lifetime of a fluorophore near a metal is due to an interaction between the fluorophore and metal particle, which enhances the radiative decay rate (quantum yield increase) or depending on distance, $d^{-3}$, causes quenching. It should be noted that lifetimes of fluorophores with high quantum yields (0.5) would decrease substantially more than the lifetimes of those with low quantum yields (0.1 and 0.01). A shorter excited-state lifetime also allows less photochemical reactions, which subsequently results in an increased fluorophore photostability. Notably, the use of low quantum yield fluorophores would lead to much larger fluorescence enhancements (i.e. $1/Q_0$) and could significantly reduce unwanted background emission from fluorophores distal from the silvered assay.

Fluorophore photostability is a primary concern in many applications of fluorescence. This is particularly true in single molecule spectroscopy. A shorter lifetime also allows for a larger photon flux. The maximum number of photons that are emitted each second by a fluorophore is roughly limited by the lifetime of its excited state. For example, a 10 ns lifetime can yield about $10^8$ photons per second per molecule, but in practice, only $10^3$ photons can be readily observed. The small number of observed photons is typically due to both photo-destruction and isotropic emission. If a metal surface decreases the lifetime, one can obtain more photons per second per molecule by appropriately increasing the incident intensity.

On the other hand, the metal-enhanced fluorescence provides enhanced intensity, while simultaneously shortening the lifetime. That is, it may be possible to decrease the excitation intensity, yet still see a significant increase in the emission intensity and photostability.

The emission enhancement may be observed at distances according to the type of fluorophore to be detected and the type, shape of the metal material, noting a difference between a film and a metallic island or colloid. For example, emission enhancement may be observed when a fluorophore distances about 5 nm to about 200 nm to metal surfaces. Preferable distances are about 5 nm to about 50 nm to metal surfaces. At this scale, there are few phenomena that provide opportunities for new levels of sensing, manipulation, and control. In addition, devices at this scale may lead to dramatically enhanced performance, sensitivity, and reliability with dramatically decreased size, weight, and therefore cost.

Attaching of the fluorophore to a probe may be achieved by any of the techniques familiar to those skilled in the art. For example, the fluorophore may be covalently attached to the bimolecular probe by methods disclosed in U.S. Pat. No. 5,194,300 (Cheung) and U.S. Pat. No. 4,774,189 (Schwartz).

In another embodiment, the assay system of the present invention provides for detecting and separating at least two target pathogen by choosing fluorophores such that they possess substantially different emission spectra, preferably having emission maxima separated by greater than 10 nm, more preferably having emission maxima separated by greater than 25 nm, even more preferably separated by greater than 50 nm. When differentiation between the two fluorophores is accomplished by visual inspection, the two dyes preferably have emission wavelengths of perceptibly different colors to enhance visual discrimination. When it is desirable to differentiate between the two fluorophores using instrumental methods, a variety of filters and diffraction gratings allow the respective emission maxima to be independently detected.

Any chemiluminescent species may be used in the present invention that provides for a chemical reaction which produces a detectable reaction (observed emission) wherein the excited state responsible for the observed emission including, but not limited to the following excitation mechanisms:

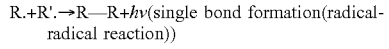
R.+R'.→R—R+$h\nu$(single bond formation(radical-radical reaction))

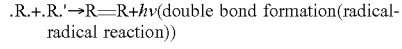
.R.+.R.'→R=R+$h\nu$(double bond formation(radical-radical reaction))

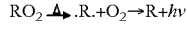
RO$_2$⟶.R.+O$_2$→R+$h\nu$

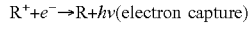
R$^+$+$e^-$→R+$h\nu$(electron capture)

Examples of suitable chemiluminescence detector molecules include but without limitation, peroxidase, bacterial luciferase, firefly luciferase, functionalized iron-porphyrin derivatives, luminal, isoluminol, acridinium esters, sulfonamide and others. A recent chemiluminescent label includes xanthine oxidase with hypoxanthine as substrate. The triggering agent contains perborate, a Fe-EDTA complex and luminol. Choice of the particular chemiluminescence labels depends upon several factors which include the cost of preparing labeled members, the method to be used for covalent coupling to the detector molecule, and the size of the detector molecules and/or chemiluminescence label. Correspondingly, the choice of chemiluminescence triggering agent will depend upon the particular chemiluminescence label being used.

Chemiluminescent reactions have been intensely studied and are well documented in the literature. For example, peroxidase is well suited for attachment to the detector molecule for use as a chemiluminescence. The triggering agent effective for inducing light emission in the first reaction would then comprise hydrogen peroxide and luminol. Other triggering agents which could also be used to induce a light response in the presence of peroxidase include isobutyraldehyde and oxygen. Procedures for labeling detector molecules, such as antibodies or antigens with peroxidase are known in the art. For example, to prepare peroxidase-labeled antibodies or antigens, peroxidase and antigens or antibodies are each reacted with N-succinimidyl 3-(2-pyridyldithio) proprionate (hereinafter SPDP) separately. SPDP-labeled peroxidase, or SPDP-labeled antigen or antibody is then reacted with dithiothreitol to produce thiol-labeled peroxidase, or thiol-labeled antigen or antibody. The thiol derivative is then allowed to couple with the SPDP-labeled antigen or antibody, or SPDP-labeled peroxidase.

The present invention provides enhanced emissions using metallic structures of elliptical, spherical, triangular, rod-like forms or any geometric form. In exemplary cases, the elliptical islands have aspect ratios of 3/2, and the spherical colloids have diameters of 20-60 nm. Using known coating techniques, the placement of metallic structures could be controlled precisely, as close as 50 nm apart.

Further, the metallic structures can be fabricated to form a geometric shape such as triangle, square, oblong, elliptical, rectangle, or any shape that provides at least one apex area of the metallic surface. It is envisioned that the apex area includes not only pointed regions but regions with rounded edges such as found in an oblong or elliptical shape. The apex areas are preferably arranged so that one apex area is opposite from another apex area and aligned to cause the reactive zone to be positioned therebetween. The distances between the apex areas may range from 0.01 mm to 5 mm, more preferably from 2 mm to about 3 mm and depending on the size of the required reactive zone. The thickness of the metallic geometric shaped forms ranges from 25 nm to about 1000 nm, and more preferably from about 45 nm to about 250 nm.

The present invention further comprises a detection device for detecting emissions including, but not limited to visual inspection, digital (CCD) cameras, video cameras, photographic film, or the use of current instrumentation such as laser scanning devices, fluorometers, luminometers, photodiodes, quantum counters, plate readers, epifluorescence microscopes, fluorescence correlation spectroscopy, scanning microscopes, confocal microscopes, capillary electrophoresis detectors, or other light detector capable of detecting the presence, location, intensity, excitation and emission spectra, fluorescence polarization, fluorescence lifetime, and other physical properties of the fluorescent signal.

Excitation light sources can include arc lamps and lasers, natural sunlight, laser diodes and light emitting diode source, and both single and multiple photon excitation sources. In another embodiment, use of a Ti-sapphire laser, Laser Diode (LD) or Light Emitting Diode Sources (LEDs) may be used with the RNA assay of the present invention. For example, using 2-photon excitation at 700-1000 nm and also using short pulse width (<50 pi), high repetition rate (1-80 MHz), laser diode and LED (1 ns, 1-10 MHz) sources. The enhanced sensitivity of the assay using 2-photon excitation, as compared to 1-photon, can be shown by using series dilution with RNA, initially with the Ti-Sapphire system, and later with LEDs and LDs. If a fluorophore absorbs two photons simultaneously, it will absorb enough energy to be raised to an excited state. The fluorophore will then emit a single photon with a wavelength that depends on the fluorophore used and typically in the visible spectra. The use of the Ti-sapphire laser with infrared light has an added benefit, that being, longer wavelengths are scattered less, which is beneficial for high-resolution imaging. Importantly, there is reduced background signal level gained by using 2-photon excitation as compared to 1-photon excitation by utilizing localized excitation near-by metallic particles.

In one embodiment, the application of low level microwave heating of the sample may be used to speed up any chemical/biochemical kinetics within the system. Notably, low level microwaves do not destroy or denature proteins, DNA, or RNA, but instead heat the sample sufficiently to provide for accelerated kinetics such as binding or hybridization. In addition, the microwaves are not scattered by the metallic structures, which is contrary to most metal objects, such as that recognized by placing a spoon in a microwave oven.

Microwaves (about 0.3 to about 300 GHz) lie between the infrared and radiofrequency electromagnetic radiations. It is widely thought that microwaves accelerate chemical and biochemical reactions by the heating effect, where the heating essentially follows the principle of microwave dielectric loss. Polar molecules absorb microwave radiation through dipole rotations and hence are heated, where as non-polar molecules do not absorb due to lower dielectric constants are thus not heated. The polar molecules align themselves with the external applied field. In the conventional microwave oven cavity employed in this work, the radiation frequency (2450 MHz) changes sign $2.45 \times 10^9$ times per second. Heating occurs due to the tortional effect as the polar molecules rotate back and forth, continually realigning with the changing field, the molecular rotations being slower than the changing electric field. The dielectric constant, the ability of a molecule to be polarized by an electric field, indicates the capacity of the medium to be microwave heated. Thus, solvents such as water, methanol and dimethyl formamide are easily heated, where as microwaves are effectively transparent to hexane, toluene and diethylether. For metals, the attenuation of microwave radiation arises from the creation of currents resulting from charge carriers being displaced by the electric field. These conductance electrons are extremely mobile and unlike water molecules can be completely polarized in 10-18 s. In microwave cavity used in the present invention, the time required for the applied electric field to be reversed is far longer than this, in fact many orders of magnitude. If the metal particles are large, or form continuous strips, then large potential differences can result, which can produce dramatic discharges if they are large enough to break down the electric resistance of the medium separating the large metal particles. Interestingly, and most appropriate for the new assay platform described herein, small metal particles do not generate sufficiently large potential differences for this "arcing" phenomenon to occur. However, as discuss hereinbelow, the charge carriers which are displaced by the electric field are subject to resistance in the medium in which they travel due to collisions with the lattice phonons. This leads to Ohmic heating of the metallic structures in addition to the heating of any surface polar molecules. Intuitively, this leads to localized heating around the metallic structures in addition to the solvent, rapidly accelerating assay kinetics.

In the present invention, microwave radiation may be provided by an electromagnetic source having a frequency in a range between 0.3 and 10 GHz and a power level in a range between about 10 mwatts and 400 watts, more preferably from 30 mwatts to about 200 watts. Any source, known to one skilled in the art may be used, such as a laser that emits light, wherein light is used in its broad sense, meaning electromagnetic radiation which propagates through space and includes not only visible light, but also infrared, ultraviolet and microwave radiation. Thus, a single instrument placed above the surface of the assay can be used to generate the microwave energy and energy to excite fluorescing molecules. The light can be emitted from a fiber continuously or intermittently, as desired, to maintain the metallic particles at a predetermined temperature such that it is capable of increasing the speed of chemical reactions within the assay system. The microwave radiation may be emitted continuously or intermittently (pulsed), as desired. In the alternative, microwave energy can be supplied through a hollow wave guide for conveying microwave energy from a suitable magnetron. The microwave energy is preferably adjusted to cause an increase of heat within the metallic material without causing damage to any biological materials in the assay system.

Although fluorescence, chemiluminescence and/or bioluminescence detection has been successfully implemented, the sensitivity and specificity of these reactions require further improvements to facilitate early diagnosis of the prevalence of disease. In addition, most protein detection methodologies, most notably western blotting, are still not reliable methods for accurate quantification of low protein concentrations without investing in high-sensitivity detection schemes. Protein detection methodologies are also limited by antigen-antibody recognition steps that are generally kinetically very slow and require long incubation times; e.g., western blots require processing times in excess of 4 h. Thus, both the rapidity and sensitivity of small-molecule assays are still critical issues to be addressed to improve assay detection. As such the use of low intensity ultrasound will increase the rapidity of the assay.

There are many important assays that can directly benefit from enhanced signal intensities and quicker kinetics. For example, myoglobin concentrations for heart attack patients, patients of toxic shock and pancreatitis. All of these assays are widely used in hospitals emergency rooms with assay times of greater than 30 minutes. Thus, the present invention can be used for points—of—care clinical assessment in emergency rooms.

Thus it would be advantageous to increase speed of any chemical or biochemical reaction by using any device capable of generating and transmitting acoustic energy through any medium to transit ultrasonic atomizing energy. The ultrasonic emitting device can be placed in either the interior of a vessel used in a detection system or positioned adjacent thereto for transmitting energy into the vessel. The device may include components for the traditional electromagnetic stimulation of piezoelectric transducers, (man-made or naturally occurring), purely mechanical devices (such as high frequency air whistles or microphones), and laser devices. Individual components for acoustic energy systems are commercially available from a wide variety of manufacturers, which can be configured to particular applications and frequency ranges. (See Thomas Directory of American Manufacturers, Photonics Buyer's Guide, 1996, Microwave and RF, and Electronic Engineer's Master Catalogue).

Any oscillator or signal generator that produces a signal with predetermined characteristics such as frequency, mode, pulse duration, shape, and repetition rate may be used to generate acoustic frequencies for applying to the system of the present invention. Various oscillators or signal generators can be commercially purchased from a wide variety of manufacturers and in a variety of designs configured to particular applications and frequencies. Applicable transducers will include types that produce an acoustic wave within a range of frequencies (broadband) or for one specific frequency (narrowband) for frequencies ranging from hertz to gigahertz.

The acoustic delivery system will be variable depending on the application. For example, acoustic energy waves can be transmitted into liquid or solid source material either by direct contact of the source material with a transducer, or by coupling of transmission of the acoustic wave through another medium, which is itself in direct contact with the source material. If the source material is a liquid, a transducer can be placed in the liquid source material, or the walls of the vaporization vessel can be fabricated of a material that acts as a transducer thereby placing the liquid source material in direct contact with the transducer. Additionally, an acoustic energy emitting device may be positioned on the exterior of a system container for transmitting the appropriate energy. If the source material is a solid, a transducer can be placed in direct contact with it or the solid source material can be placed in a gas or liquid that is used as a coupling agent.

In the preferred acoustic frequencies any system that generates acoustic energy may be utilized. Preferably, the output of the ultrasonic generator is of a sufficient frequency to provide a movement flow within the system vessel to move molecules to the source of binding or reaction site without causing a large increase of heat in the system. For example, using the power output of 0.5 to 50 W at a frequency of 10 to 200 kHz, and more preferably from about 20 to 60 kHz and most preferably at about 40 kHz.

To obtain the maximum transfer of acoustical energy from one medium to another, the characteristic acoustical impedance of each medium is preferably as nearly equal to the other as possible. The matching medium is sandwiched between the other two and should be the appropriate thickness relative to the wavelength of the sound transmitted, and its acoustical impedance R should be nearly equal to ($R_1$: $R_2$). Any impedance matching device that is commercially available can be utilized in the present invention.

The system may include ultrasonic vessels wherein at least a section of the vessel includes a transducer such as a piezoelectric transducer to generate acoustic vibrations. Such transducers can be located in the bottom of a vessel or in a plate whereon a vessel may be placed. Further such transducers can be placed at different levels on the vessel walls to enhance fluid flow within the vessel.

The metallic particle may be prepared by reduction of metal ions using various reducing agents. For example, sodium hydroxide may be added to a rapidly stirred silver nitrate solution forming a brown precipitate. Then ammonium hydroxide is added to re-dissolve the precipitate. Metallic island particles are prepared by reduction of metal ions using various reducing agents. For example, sodium hydroxide is added to a rapidly stirred silver nitrate solution forming a brown precipitate. Ammonium hydroxide is added to re-dissolve the precipitate. The solution is cooled and dried wells are added to the solution. After stirring for 2 minutes, the mixture is warmed to 30° C. After 10-15 minutes, the mixture turns yellow-green and becomes cloudy. A thin film of silver particles has formed on the bottom and sides of the wells as can be seen from their brown green color. The wells are rinsed with pure water prior to use.

Metal colloids can be prepared as suspensions by citrate reduction metals. Preferred metals are silver and gold. Again, gold may be used because of the absorption of gold at shorter wavelengths. However, gold colloids may also be used with longer wavelength red and NIR fluorophores. The size of the colloids and their homogeneity can be determined by the extensive publications on the optical properties of metal particles available and the effects of interface chemistry on the optical property of colloids.

Forming and attaching the hydrophilic ligands on the metallic structure is easily accomplished by placing metalized surface in a solution comprising the functional chemical groups such as amine ($NH_2$) or thiol (SH) containing hydrophilic ligands and waiting a sufficient time for attachment to the metallic structures. Metallic structures, such as gold and silver are known to spontaneously bind to such functional groups with high affinity thereby providing for hydrophilic metallic structures.

Further a metallic layer of metallic particles can be prepared by Vacuum Vapor Deposition. The substrate can be pretreated by air plasma under $1\times10^{-4}$ mbar for 3 min before depositing the metallic particles. A silver wire can be melted on a filament, evaporated under a pressure of $<1\times10^{-7}$ mbar, and deposited onto the glass slides. The deposition rate can be adjusted by the filament current (1 angstrom/sec), and the thickness of layer of particles can be measured with a quartz crystal microbalance positioned close-to the glass substrate within the deposition chamber.

Method and Materials

Preparation of Silver Island Films (SIF)

SiFs were prepared as was previously published.(12) In a typical SiFs preparation, a solution of silver nitrate (0.5 g in 60 ml of deionized water) was prepared n a solution container. 200 uL of freshly prepared 5% (w/v) sodium hydroxide solution and 2 ml of ammonium hydroxide were added to a continuously stirred silver nitrate solution at room temperature. The solution was subsequently cooled to 5° C. by placing the solution container in an ice bath, followed by soaking a 96 wells container in the solution and adding a fresh solution of D-glucose (0.72 g in 15 ml of water). The temperature of the mixture was then warmed to 30° C. As the color of the mixture turned from yellow green to yellowish brown, the solution container was removed from heat and the 96 well container was kept in solution for 5-30 mins depending on the required resistance. The 96 well container was then removed from the mixture, washed with water and dried under $N_2$.

Hydrophilic ligands were attached to the metallic particles through either a sulfhydryl group (—SH) or amino group (—NH2). These groups have an affinity for silver. The hydrophilic groups increase wettability. The solutions of the SH and/or NH2 containing ligands were introduced into the container with the wells for a period of time, and at a suitable concentration to get the appropriate coating.

FIG. 1 shows that treating with hydrophilic groups makes the surface of the silver coating more hydrophilic and thus solutions of aqueous dye molecules readily spread out on the surface. Hence silver hydrophilic coatings readily enable MEF to be observed from very low volumes of solutions within the 96-wells. RB—Rose Bengal Fluorophore. Further as shown in FIG. 1, the hydrophilic coating approach of the present invention removes any possible "lensing effects" from low volume solution balls, compare FIG. 1 (left with hydrophilic coating) and right (without hydrophilic coating. As stated above, silver in its $Ag°$ state is hydrophobic and thus small volumes of aqueous media when applied to silver substrates, exhibit classic hydrophilic-hydrophobic interactions, as evidenced by the ball-like nature of drops of 4 different fluorophores in aqueous buffers, FIG. 1 right. This "balling" of the aqueous hydrophilic liquids on the hydrophobic $Ag°$ silver surface, often produces non-reproducible fluorescence intensities based on the position of the liquid ball within the well or surface as read by a fluorescence reader (such as a plate reader), preventing/hindering low solution volumes being used on surfaces or within silvered 96-well plates, for applications such as in immunoassays and other diagnostics. However, as shown in the left box of FIG. 1, the different aqueous solutions of fluorophores "spread out" across the surfaces of the now hydrophilic silver, providing for a more uniform surface coating of fluorophore within the well.

Figure 2:
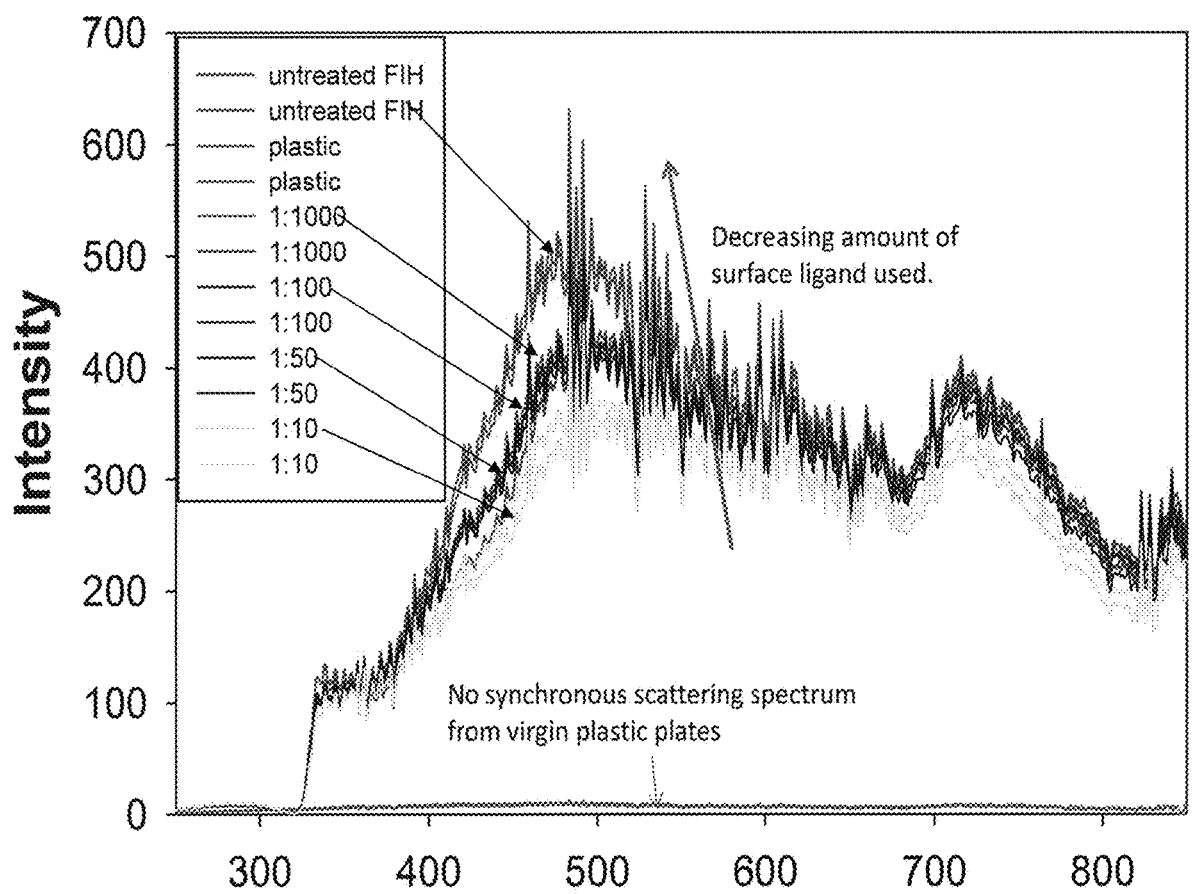
FIG. 2 shows synchronous scatter spectra of a 96-silvered-well plate treated with mercaptoacetic acid.
Figure 3:
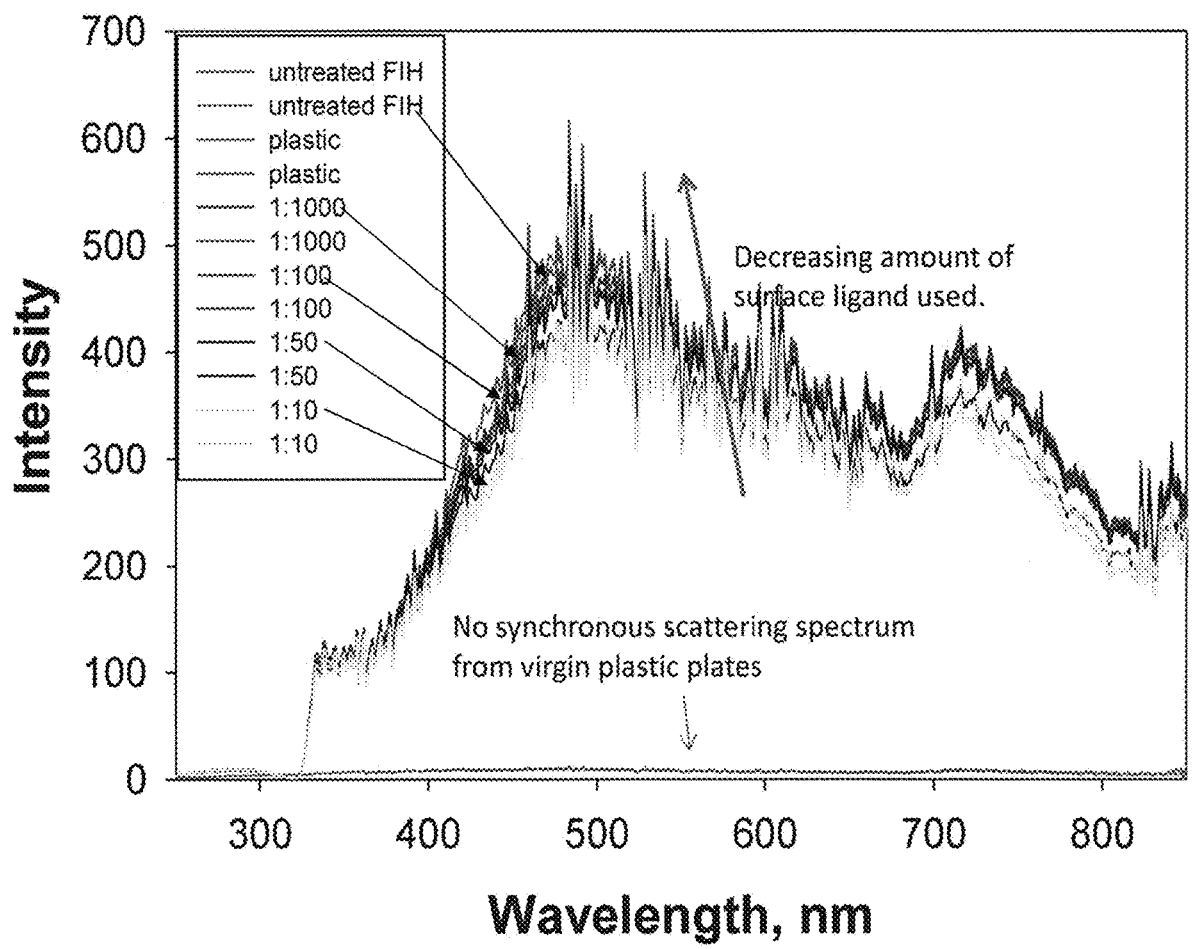
FIG. 3 shows synchronous scatter spectra of a 96-silvered-well plate treated with mercaptopropionic acid.

FIG. 2 shows Synchronous scatter spectrum (Ex=Em Vs wavelength) for silver coated 96-well plates, as a function of the amount of hydrophilic surface ligand used (mercaptoacetic acid (MAA)). More surface ligand removes scattering intensity due to loss of surface plasmons, i.e. electrons involved in silver-ligand bond. FIG. 3 shows the synchronous scatter spectrum (Ex=Em Vs wavelength) for silver coated 96-well plates, FIH plates, as a function of the amount of hydrophilic surface ligand used (mercaptopropionic acid (MPA)). Again it is shown that more surface ligand removes scattering intensity due to loss of surface plasmons, i.e. electrons involved in silver-ligand bond. FIH—Fire-in-the-hole 96-silvered-well plate. Interestingly and surprisingly, FIGS. 2 and 3 show that the surfaces are not destroyed or lose their MEF character when we use both ligands, namely the MAA or MPA. This is evidenced by the fact that the synchronous scatter spectra of the surfaces are identical in shape for both the untreated and ligand treated wells. Interestingly, the larger the concentration of ligand used (highest used was a 1:10 dilution of neat liquid ligand in ethanol, noting that both ligands are liquids at room temperature), then the lower the synchronous scatter intensity. This is a most logical observation when it is noted that more surface bonds made with the metal, reduce the plasmon free electron surface density, which in turn makes the surface less "scattering". No ratio of ligand:solvent was observed which removed the MEF ability of the silver coatings, including neat liquid ligand. The traces at the bottom of both FIGS. 2 and 3 are the synchronous scattering spectrum from a plastic virgin 96-well plate. As expected, no synchronous spectra are observed as no plasmonic nanoparticles are present.

Figure 4:
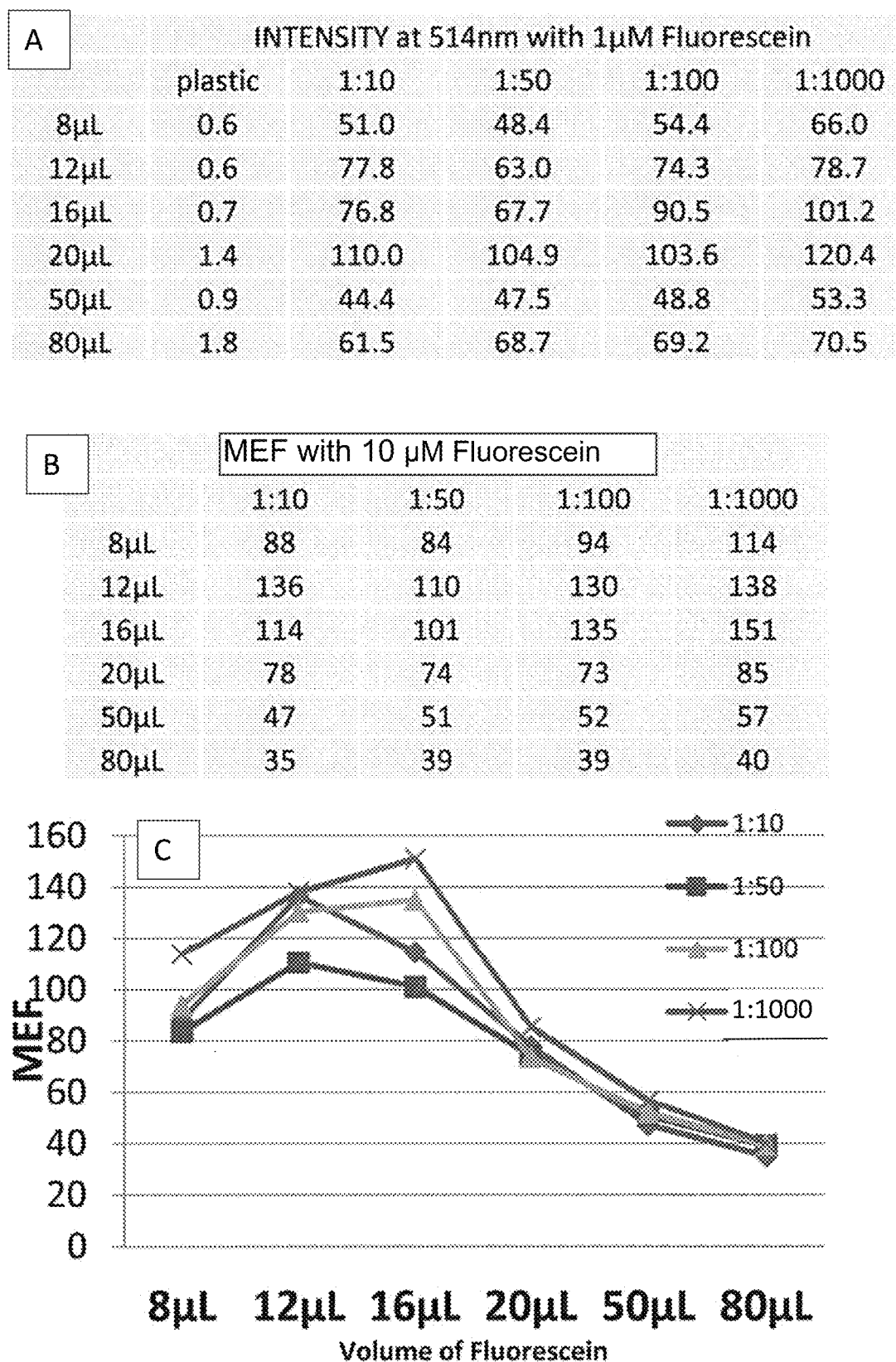
FIG. 4 shows metal enhanced fluorescence for (A) 1 micromolar fluorescein concentration and (B) 10 micromolar fluorescein concentration.
Figure 4:
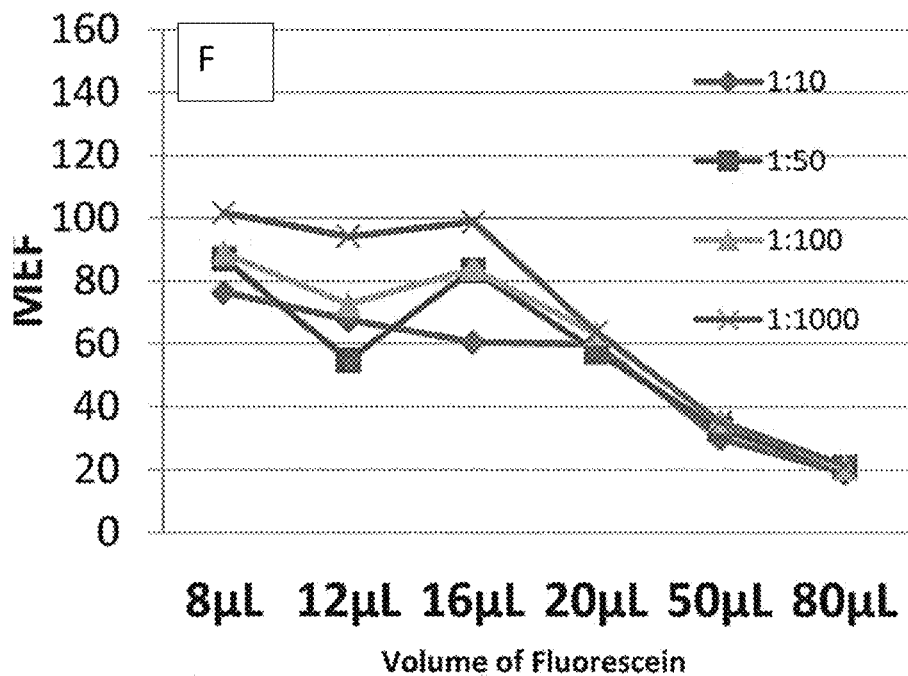

FIG. 4 shows metal enhanced fluorescence (MEF) from the silvered 96-wells with 1 and 10 micromolar fluorescein concentration, (A, B and C) and (D, E and F) respectively, as a function of well volume, x-axis. The MEF factor is the ratio of the intensity from the silvered well, versus that of the control well containing no silver. The data shows that low volumes give greater MEF enhancements. The ratios are the dilution factors of the ligands in ethanol. Remarkably, by reducing the volume of the fluorophore solution within the wells, FIG. 4, the metal-enhanced fluorescence enhancement factor increases for the hydrophilic coated surfaces. The significance of this cannot be over stated, especially given that most workers wish to use smaller volumes of reagents to reduce their reagent costs.

Figure 5:
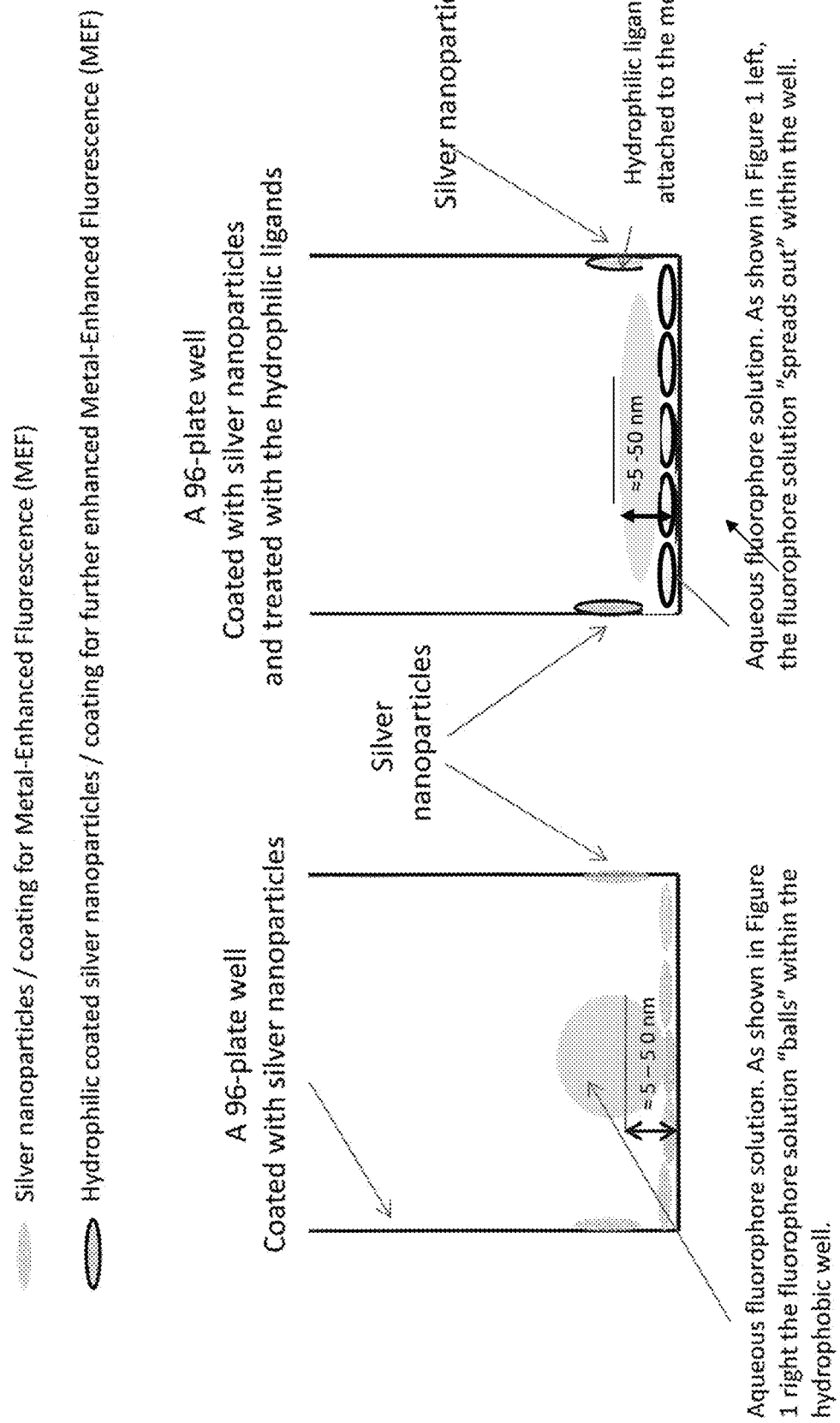
FIG. 5 shows metal enhanced fluorescence from silvered 96 wells without (left) and with (right) hydrophilic coating.

To understand this effect, consider FIG. 5 which shows metal-enhanced fluorescence (MEF) from the silvered 96-wells both with (Left) and without (Right) a hydrophilic coating on the metal. Because the hydrophilic character of the ligands makes the silver (or other metal) more wetable, the solution "spreads out," as seen in FIG. 1 (left). This has the significant advantage that the majority of the aqueous fluorophore solution is now closer to the metal, and subsequently a greater net fluorescent enhancement is seen. The hydrophilic coatings on the metals, makes them more hydrophilic, which in turns makes the solutions "lie down". This in essence reduces the near-field volume, and puts many more fluorophores close-to the metal, resulting in enhanced fluorescence. As shown in FIG. 4, the coatings allow for enhanced fluorescence to be observed from very small sample volumes.

The optics of many 96-well and other plate readers are usually quite different. Several plate readers have focusing optics in the center of a well, while others, such as the Varian Cary Eclipse collect fluorescence from just above the well. The present hydrophilic coatings do not cause any lensing effects, in fact they remove this property from wells.

The hydrophilic nature of the ligands allows for both metal-enhanced fluorescence and low volumes of solutions to be used on the metals, which otherwise would not be practical. The surfaces can be used with immunoassays, DNA, Proteins, RNA, Peptides etc, where tiny volumes are preferred due to the cost and/or availability of the reagents. Greater enhancements in fluorescence will be achievable with the hydrophilic coatings as compared to virgin hydrophobic metal. The coatings can be applied to 96, 384 and 1536 well plates and high-density protein array slides, which spot very tiny amounts of material. The coatings can be applied to both plastic and glass plate wells, which host the metal nanoparticles on the surface.

The coatings can be used with microwave-accelerated assays, as well as ideal in microscopy, such as in confocal fluorescence microscopy or fluorescence-correlation spectroscopy, where very tiny volumes are studied. The fact that many more fluorophores are closer to the metal, due to the coating, will afford for a greater "system" photostability. In MEF, fluorophores close to the metal surface, 5-50 nm, are photostable, therefore if the solution "lies down", more fluorophores will be in the near field and therefore the system is subsequently more photostable.

This coating approach to be applicable to almost any metal coated well, and is not dependent on how the silver (or other metal) is deposited.

REFERENCES

The contents of all references are incorporated by reference herein for all purposes.

1. D'Agostino, S., Pompa, P. P., Chiuri, R., Phaneuf, R. J., Britti, D. G., Rinaldi, R., Cingolani, R., and Della Sala, F. (2009) Enhanced fluorescence by metal nanospheres on metal substrates, *Opt. Lett.* 34, 2381-2383.
2. Dragan, A. I., Bishop, E. S., Casas-Finet, J. R., Strouse, R. J., Schenerman, M. A., and Geddes, C. D. (2010) Metal-enhanced PicoGreen fluorescence: Application for double-stranded DNA quantification, *Anal. Biochem.* 396, 8-12.
3. Geddes, C. D. and Lakowicz, J. R. (2002) Metal-enhanced fluorescence, *Journal of Fluorescence* 12, 121-129.
4. Geddes, C. D. (2010) *Metal-Enhanced Fluorescence* John Willey & sons, Inc., Hoboken, N.J.

5. Lakowicz, J. R. (2006) *Principles of fluorescence spectroscopy* Springer Science+Business Media, LLC, New York.
6. Aslan, K., Gryczynski, I., Malicka, J., Matveeva, E., Lakowicz, J. R., and Geddes, C. D. (2005) Metal-enhanced fluorescence: an emerging tool in biotechnology, *Current Opinion in Biotechnology* 16, 55-62.
7. Aslan, K., Previte, M. J. R., Zhang, Y. X., Gallagher, T., Baillie, L., and Geddes, C. D. (2008) Extraction and detection of DNA from *Bacillus anthracis* spores and the vegetative cells within 1 min, *Analytical Chemistry* 80, 4125-4132.
8. Mackowski, S., Wormke, S., Maier, A. J., Brotosudarmo, T. H., Harutyunyan, H., Hartschuh, A., Govorov, A. O., Scheer, H., and Brauchle, C. (2008) Metal-enhanced fluorescence of chlorophylls in single light-harvesting complexes, *Nano. Lett.* 8, 558-564.
9. Matveeva, E. G., Gryczynski, I., Barnett, A., Leonenko, Z., Lakowicz, J. R., and Gryczynski, Z. (2007) Metal particle-enhanced fluorescent immunoassays on metal mirrors, *Analytical Biochemistry* 363, 239-245.
10. Drexhage, K. H. (1970) Influence of a dielectric interface on fluorescence decay time, *J. Lumin* 1, 693-701.
11. Persson, B. N. J. (1978) Theory of dumping of excited molecules located above a metallic-surface, *J. Phys. C Solid State Phys* 4251-4269.
12. Aslan, K.; Geddes, C. D., *Analytical Chemistry* 2005, 77, 8057-8067.

That which is claimed is:

1. A metal-enhanced fluorescence method comprising:
    (a) providing a well plate comprising a multiplicity of wells, wherein the plate can be used in a High Throughput Screening (HTS) system;
    (b) coating the wells with metallic colloid structures consisting essentially of at least one plasmonic metal;
    (c) incubating the wells of (b) with a hydrophilic ligand to form a hydrophilic coating for increasing the wettability of the wells, wherein the coating covers all exposed surfaces of the metallic structures to form hydrophilically-coated metallic structures, wherein the hydrophilic coating has a thickness from 0.1 nm to 5 nm, and wherein the hydrophilic ligand is selected from the group consisting of mercaptoacetic acid (MAA), mercaptopropionic acid (MPA), and mercaptosuccinic acid (MSA);
    (d) coupling a binding receptor having affinity for a target molecule to the hydrophilically-coated metallic structures in each well;
    (e) introducing in the wells of (d), an aqueous solution comprising the target molecule for binding to the binding receptor to form a binding receptor-target complex;
    (f) introducing in the wells of (e), a volume of an aqueous solution of a fluorophore-labeled detector molecule having affinity for the target molecule, to form a receptor-target molecule-detector complex;
    (g) applying electromagnetic energy to excite the fluorophore; and
    (h) measuring the metal-enhanced fluorophore emission signal from each well to detect the target molecule,
    wherein the fluorophore is positioned in a range of 5 nm to 50 nm from the plasmonic metal, and wherein metal-enhanced fluorescence increases in wells comprising the hydrophilically-coated metallic structures as compared to wells comprising uncoated metallic structures, to allow for enhanced fluorescence to be measured from smaller aqueous solution volumes comprising the fluorophore.

2. The method according to claim 1, wherein hydrophilically-coated metallic structures increase the intensity of emission of the fluorophore by locally enhanced excitation.

3. The method according to claim 1, wherein the metallic structures consist essentially of silver, gold, or a combination thereof.

4. The method according to claim 1, wherein the multiplicity of wells comprise material selected from the group consisting of glass, quartz, polymeric materials, and cellulose.

5. The method according to claim 1, where the hydrophilic coating increases aqueous dispersibility over the metallic structures.

6. The method according to claim 1, wherein the hydrophilic coating consists of mercaptoacetic acid (MAA).

7. The method according to claim 1, wherein the metallic structures have a geometric shape selected from the group consisting of spheres, islands, colloid shaped, oblongs, triangles, squares, ellipticals, and rectangles.

8. The method according to claim 1, wherein the hydrophilic coating consists of mercaptopropionic acid (MPA).

9. The method according to claim 1, further comprising measuring concentration of the target molecule in the aqueous solution.

\* \* \* \* \*